(12) United States Patent
Nagaluru et al.

(10) Patent No.: US 12,447,855 B2
(45) Date of Patent: Oct. 21, 2025

(54) BATTERY SYSTEM

(71) Applicant: LG Energy Solution, Ltd., Seoul (KR)

(72) Inventors: Sagar Nagaluru, Rochester Hills, MI (US); Nitin Bharane, Rochester Hills, MI (US); Sandeep Vankineni, Warren, MI (US); Bhavya Jampani, Warren, MI (US)

(73) Assignee: LG Energy Solution, Ltd., Seoul (KR)

( * ) Notice: Subject to any disclaimer, the term of this patent is extended or adjusted under 35 U.S.C. 154(b) by 159 days.

(21) Appl. No.: 18/530,522

(22) Filed: Dec. 6, 2023

(65) Prior Publication Data

US 2025/0187488 A1 Jun. 12, 2025

(51) Int. Cl.
| | | |
|---|---|---|
| G06F 1/00 | (2006.01) | |
| B60L 58/10 | (2019.01) | |
| H01M 10/42 | (2006.01) | |
| H02J 7/00 | (2006.01) | |
| G06F 1/3203 | (2019.01) | |
| G08C 17/02 | (2006.01) | |

(52) U.S. Cl.
CPC ........... *B60L 58/10* (2019.02); *H01M 10/425* (2013.01); *H02J 7/00308* (2020.01); *H02J 7/0047* (2013.01); *B60L 2240/547* (2013.01); *G06F 1/3203* (2013.01); *G08C 17/02* (2013.01); *H01M 2010/4278* (2013.01)

(58) Field of Classification Search
CPC .......................... B60L 58/10; B60L 2240/547; H01M 10/425; H01M 2010/4278; H02J 7/00308; H02J 7/0047; G08C 17/02
USPC ........................................................ 713/300
See application file for complete search history.

(56) References Cited

U.S. PATENT DOCUMENTS

| | | | | |
|---|---|---|---|---|
| 2013/0271072 | A1* | 10/2013 | Lee | H01M 10/4207 320/108 |
| 2015/0188334 | A1* | 7/2015 | Dao | H02J 7/0013 702/63 |
| 2015/0340888 | A1* | 11/2015 | Hofer | G01N 7/00 374/143 |
| 2018/0012484 | A1* | 1/2018 | Sakabe | G08C 25/00 |

(Continued)

FOREIGN PATENT DOCUMENTS

| | | |
|---|---|---|
| KR | 20140007600 A | 1/2014 |
| KR | 1020140015273 A | 2/2014 |

(Continued)

*Primary Examiner* — Volvick Derose
(74) *Attorney, Agent, or Firm* — Bookoff McAndrews, PLLC

(57) ABSTRACT

A battery system includes a battery subpack having first and second battery cells, a cell monitoring circuit, a RF transmitter, an RF receiver, a subpack microprocessor, and a first transceiver. The circuit measures a voltage of a first battery cell. The system includes a master controller having a second transceiver. The RF transmitter sends a voltage value corresponding to the voltage of the first battery cell to the RF receiver. The subpack microprocessor determines the first battery cell has an overvoltage condition based on the voltage value and sends an overvoltage message to the master controller via the first and second transceivers. The subpack microprocessor induces first and second subpack contactors to each have an open operational state when the master controller sends an open command to the subpack microprocessor.

20 Claims, 7 Drawing Sheets

(56) References Cited

U.S. PATENT DOCUMENTS

| | | | |
|---|---|---|---|
| 2019/0143834 A1* | 5/2019 | Godo | B60L 58/21 |
| | | | 702/63 |
| 2020/0106278 A1* | 4/2020 | Sung | H02J 7/0047 |
| 2021/0247461 A1* | 8/2021 | Park | H02J 7/0047 |
| 2021/0336301 A1* | 10/2021 | Hwang | H01M 10/486 |
| 2022/0368364 A1* | 11/2022 | Martinez | H02J 7/0047 |
| 2024/0241205 A1* | 7/2024 | Sylvester | H01M 10/48 |
| 2025/0007012 A1 | 1/2025 | Jeon | |
| 2025/0112286 A1* | 4/2025 | Jeong | H01M 10/441 |

FOREIGN PATENT DOCUMENTS

| | | |
|---|---|---|
| KR | 20140122776 A | 10/2014 |
| KR | 1020170088530 A | 8/2017 |
| KR | 1020190060389 A | 6/2019 |
| KR | 20210053087 A | 5/2021 |
| KR | 1020230081153 A | 6/2023 |

\* cited by examiner

BATTERY SYSTEM

BACKGROUND

A vehicle battery pack typically has a plurality of battery subpacks electrically coupled in parallel to one another. Each battery subpack has a monitoring circuit that monitors the parameters of batteries in the battery subpack and a plurality of cables attached between the monitoring circuit and the subpack microprocessor. Each battery in the battery subpack has an associated cable attached between the monitoring circuit and the subpack controller. Since there can be numerous batteries in each battery subpack, the number of cables in the battery pack can be relatively large which undesirably results in a relatively large battery pack housing and increased weight.

Further, the vehicle battery pack typically has a master controller that receives messages from subpack microprocessors in the battery subpacks. The master controller can electrically decouple battery subpacks from a vehicle powertrain utilizing battery pack contactors. However, the battery subpacks do not have battery subpack contactors to decouple individual battery subpacks from a remaining portion of the battery subpacks when degraded operation occurs in a respectively battery subpack.

The inventors herein have recognized a need for an improved battery system wherein each battery subpack utilizes an RF transmitter and RF receiver to communicate between a cell monitoring circuit and a subpack microprocessor instead of using cables therebetween which reduces a weight of the battery pack. Further, each battery subpack has battery subpack contactors which can decouple the battery subpack from a remaining portion of the battery subpacks.

SUMMARY

A battery system according to aspects of the disclosure is provided. The battery system includes a battery subpack having first and second battery cells electrically coupled in series to one another, a cell monitoring circuit, a RF (i.e., radio frequency) transmitter, an RF receiver, a subpack microprocessor, and a first transceiver. The cell monitoring circuit is operably coupled to the first and second battery cells and the RF transmitter. The subpack microprocessor is operably coupled to the RF receiver and the first transceiver. The cell monitoring circuit measures a voltage of the first battery cell. The battery system further includes a master controller having a second transceiver that communicates with the first transceiver. The RF transmitter of the battery subpack sends a voltage value corresponding to the voltage of the first battery cell to the RF receiver. The subpack microprocessor receives the voltage value from the RF receiver and determines the first battery cell has an overvoltage condition based on the voltage value. The subpack microprocessor sends an overvoltage message to the master controller via the first and second transceivers. The subpack microprocessor induces first and second subpack contactors to each have an open operational state when the master controller sends an open command to the subpack microprocessor via the first and second transceivers.

A battery system according to other aspects of the disclosure is provided. The battery system includes a battery subpack having first and second battery cells electrically coupled in series to one another, a cell monitoring circuit, a RF transmitter, an RF receiver, a subpack microprocessor, and a first transceiver. The cell monitoring circuit is operably coupled to the first and second battery cells and the RF transmitter. The subpack microprocessor is operably coupled to the RF receiver and the first transceiver. The cell monitoring circuit measures a voltage of the first battery cell. The battery system includes a master controller having a second transceiver that communicates with the first transceiver. The RF transmitter of the battery subpack sends a voltage value corresponding to the voltage of the first battery cell to the RF receiver. The subpack microprocessor receives the voltage value from the RF receiver and determines the first battery cell has an overvoltage condition based on the voltage value. The subpack microprocessor sends an overvoltage message to the master controller via the first and second transceivers. The subpack microprocessor induces first and second subpack contactors to each have the open operational state when no open command is received from the master controller within a predetermined amount of time after sending the overvoltage message.

A battery system according to other aspects of the disclosure is provided. The battery system includes a battery subpack having first and second battery cells electrically coupled in series to one another, a cell monitoring circuit, a RF transmitter, an RF receiver, a subpack microprocessor, and a first transceiver. The cell monitoring circuit is operably coupled to the first and second battery cells and the RF transmitter. The subpack microprocessor is operably coupled to the RF receiver and the first transceiver. The cell monitoring circuit measures a voltage of the first battery cell. The battery system includes a master controller having a second transceiver that communicates with the first transceiver. The RF transmitter of the battery subpack sends a voltage value corresponding to the voltage of the first battery cell to the RF receiver. The subpack microprocessor receives the voltage value from the RF receiver and determines the first battery cell has an overvoltage condition based on the voltage value. The subpack microprocessor sends an overvoltage message to the master controller via the first and second transceivers. The subpack microprocessor induces first and second subpack contactors to each have an open operational state when the master controller sends an open command to the subpack microprocessor via the first and second transceivers or when no open command is received from the master controller within a predetermined amount of time after sending the overvoltage message.

DETAILED DESCRIPTION

Figure 1:
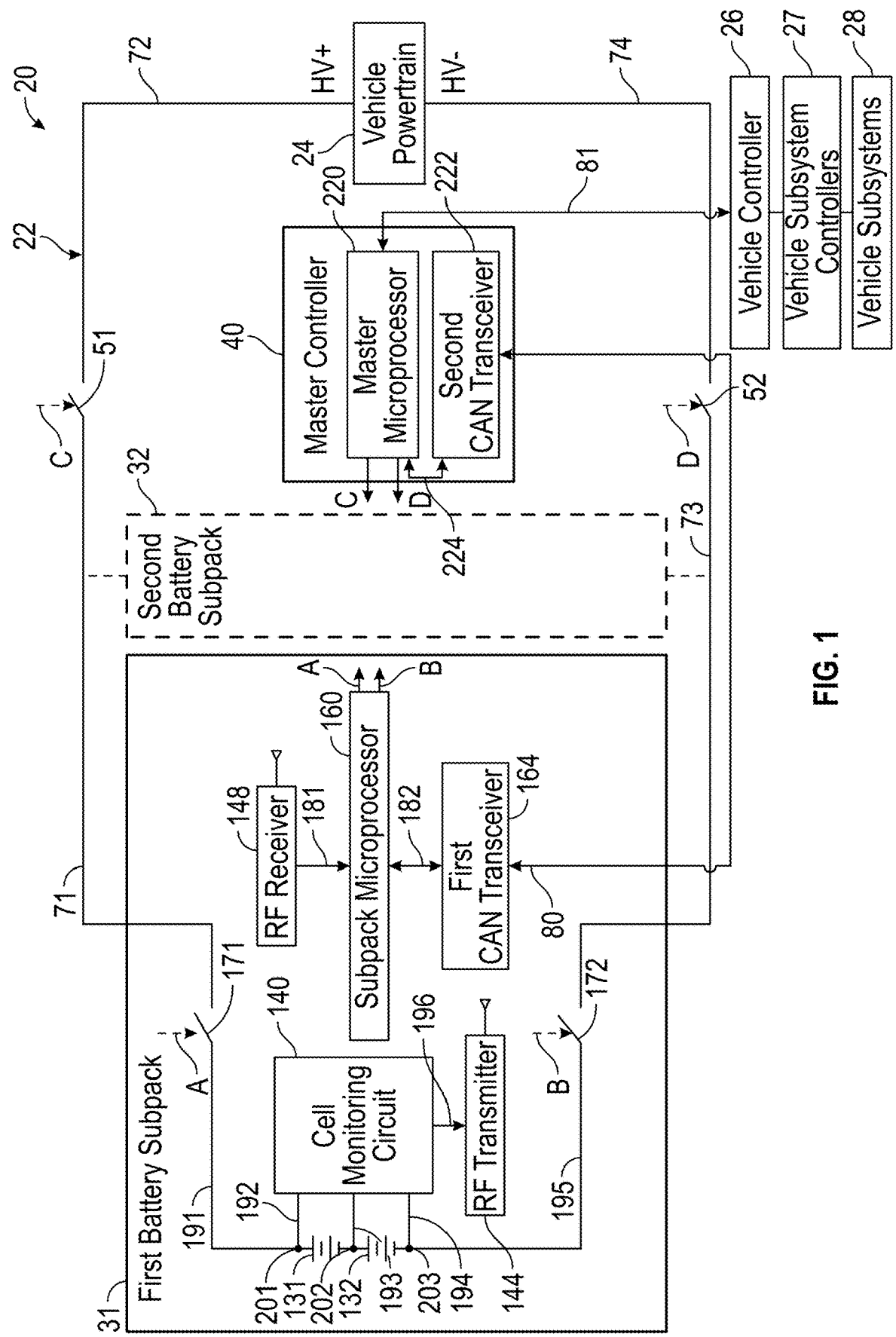
FIG. 1 is a schematic of a vehicle having a battery system according to aspects of the disclosure.
Figure 2:
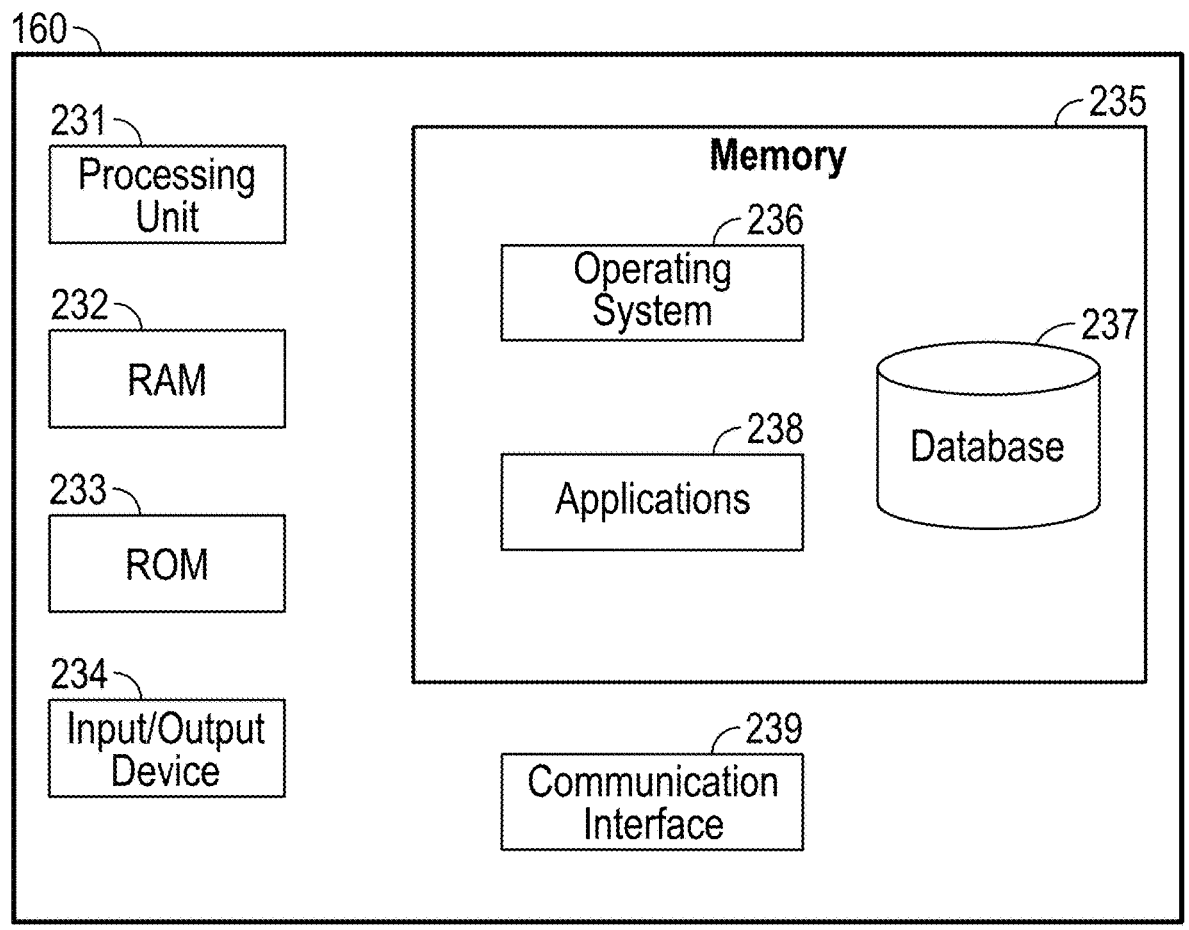
FIG. 2 is a block diagram of a microprocessor utilized in the vehicle of FIG. 1.
Figure 3:
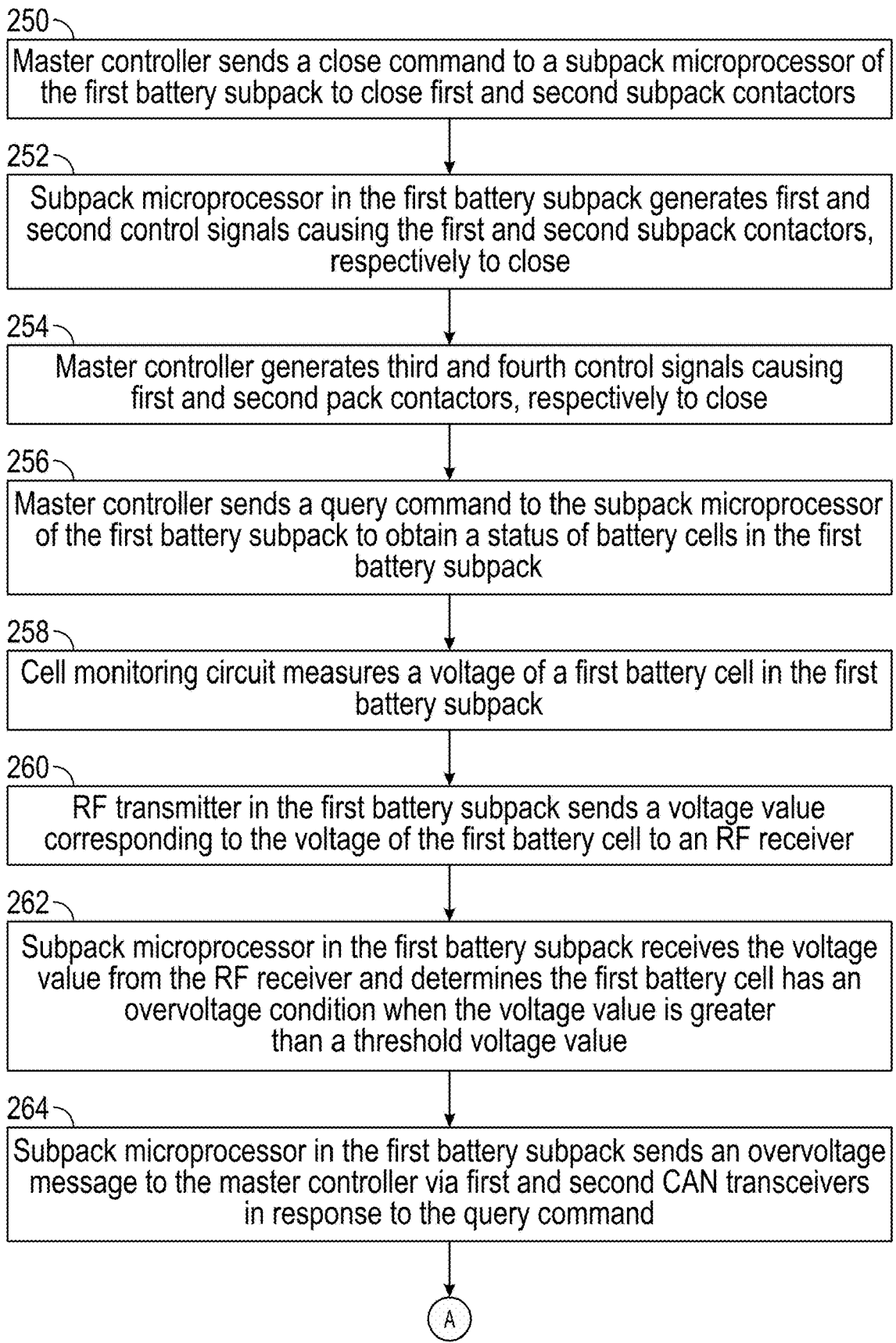
FIGS. 3-5 are flowcharts of a method of operating the battery system of FIG. 1.
Figure 4:
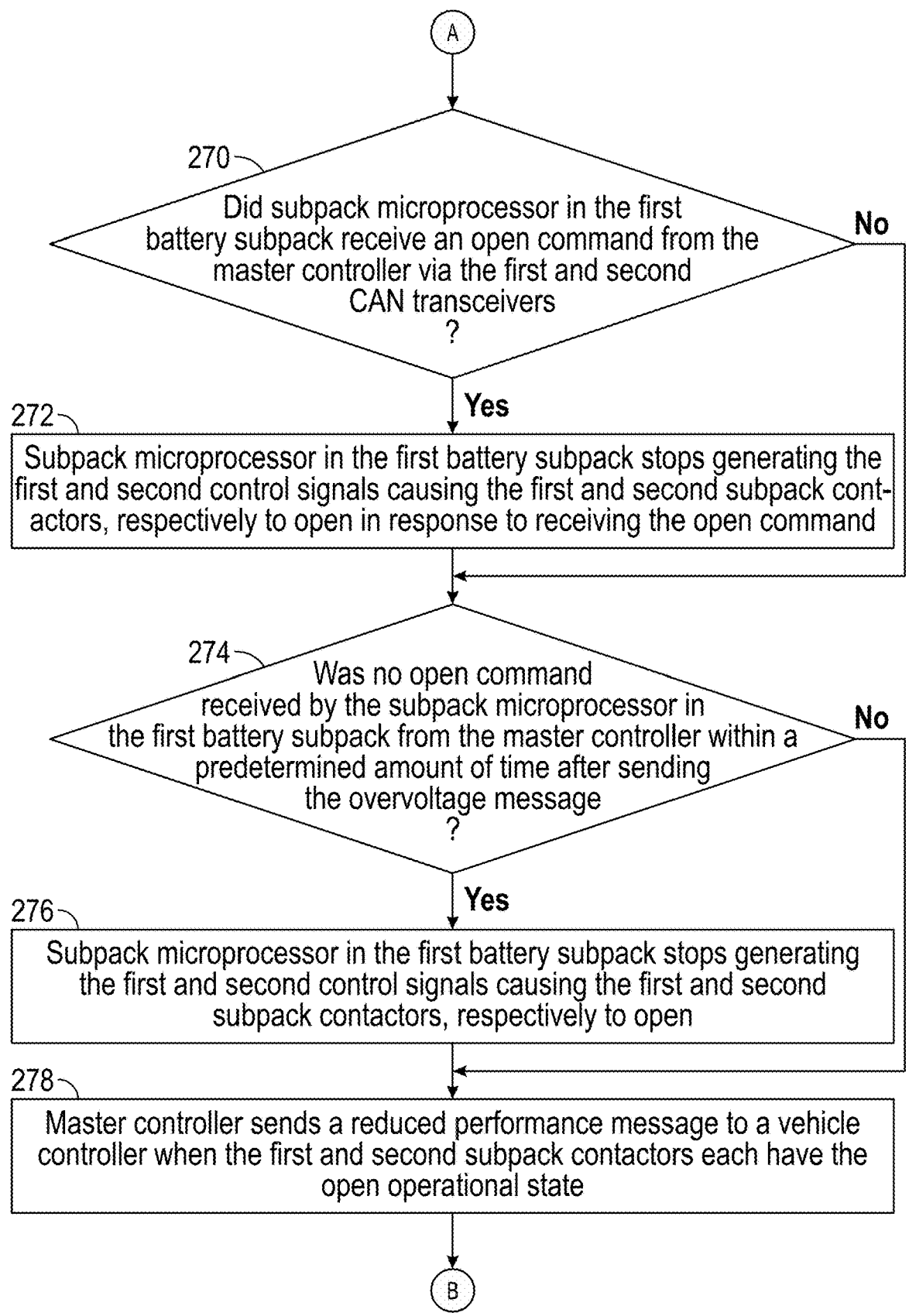

Referring to FIGS. 1-2, a vehicle 20 having a battery system 22, a vehicle powertrain 24, a vehicle controller 26, vehicle subsystem controllers 27, and vehicle subsystems 28 is provided.

The term "contactor" means an electrically controlled switch used for switching an electrical power circuit. A contactor can conduct a relatively large electrical current therethrough that is useful in electric vehicle applications.

The term "RF signal" means a radio frequency signal. In particular, an RF signal is transmitted across space without the need for electrical wires.

The battery system 22 provides electrical energy to the vehicle powertrain 24 in response to commands from the vehicle controller 26. The battery system 22 includes a first battery subpack 31, a second battery subpack 32, a master controller 40, a first pack contactor 51, a second pack contactor 52, electrical lines 71, 72, 73, 74, a communication bus 80, and a communication bus 81.

An advantage of the battery system 22 is that the first battery subpack 31 determines if an overvoltage condition has occurred in the first battery subpack 31 and can electrically decouple itself from the second battery subpack 32 and the vehicle powertrain 24 if the overvoltage condition has occurred by opening first and second subpack contactors 171, 172. Thus, a vehicle driver can have a greater vehicle range with the battery system 22 as compared to other systems that would merely open a pair of pack contactors to decouple an entire battery system from a vehicle powertrain when an overvoltage condition occurred in a single battery subpack, resulting in no power being supplied to an electric vehicle. Further, another advantage of the battery system 22 is that each battery subpack utilizes an RF transmitter and RF receiver to communicate between a cell monitoring circuit and a subpack microprocessor instead of using communication cables therebetween which reduces a weight of the battery pack and decreases an amount of space required for the battery subpacks.

The first battery subpack 31 is electrically coupled in parallel to the second battery subpack 32. The first battery subpack 31 includes a first battery cell 131, a second battery cell 132, a cell monitoring circuit 140, an RF transmitter 144, an RF receiver 148, a subpack microprocessor 160, a first CAN (i.e., Controller Area Network) transceiver 164, a first subpack contactor 171, a second subpack contactor 172, communication buses 181, 182, electrical lines 191, 192, 193, 194, 195, 196 and electrical nodes 201, 202, 203.

The first and second battery cells 131, 132 are electrically coupled in series to one another and are provided to output an operational voltage therefrom. In particular, the first battery cell 131 has a positive terminal electrically coupled to the electrical node 201 and the electrical line 191. Further, the first battery cell 131 has a negative terminal that is electrically coupled to the electrical node 202 and the electrical line 193. The second battery cell 132 has a positive terminal electrically coupled to the electrical node 202 and the electrical line 193. Further, the second battery cell 132 is a negative terminal electrically coupled to the electrical node 203, the electrical line 194, and the electrical line 195. Of course, alternately additional battery cells could be electrically coupled in series with the first and second battery cells 131, 132.

The cell monitoring circuit 140 is electrically coupled to the electrical lines 192, 193, 194, and to the RF transmitter 144 via the electrical line 196. The cell monitoring circuit 140 is provided to measure a voltage that is output by the first battery cell 131 and a voltage output by the second battery cell 132. In particular, the cell monitoring circuit 140 measures the voltage output by the first battery cell 131 utilizing the electrical lines 192, 193 and sends a voltage value corresponding to the voltage of the first battery cell 131 to the RF transmitter 144. The RF transmitter 144 transmits an RF signal with the voltage value therein to the RF receiver 148. Further, the cell monitoring circuit 140 measures the voltage output by the second battery cell 132 utilizing the electrical lines 193, 194 and sends a voltage value corresponding to the voltage of the second battery cell 132 to the RF transmitter 144. The RF transmitter 144 transmits an RF signal with the voltage value therein to the RF receiver 148.

The RF receiver 148 is provided to receive RF signals from the RF transmitter 144 having voltage values therein and to send the voltage values to the subpack microprocessor 160. The RF receiver 148 operably communicates with the subpack microprocessor 160 via the communication bus 181.

The subpack microprocessor 160 is provided to monitor the voltages of the first and second battery cells 131, 132, to communicate messages to the master controller 40, and to control an operational state of each of the first and second subpack contactors 171, 172. The subpack microprocessor 160 is operably coupled to the RF receiver 148, the first CAN transceiver 164, the first subpack contactor 171, and the second subpack contactor 172. In particular, the subpack microprocessor 160 operably communicates with the RF receiver 148 via the communication bus 181. Further, the subpack microprocessor 160 operably communicates with the first CAN transceiver 164 via the communication bus 182.

Referring to FIG. 2, the subpack microprocessor 160 includes a processing unit 231 for controlling overall operation of the microprocessor 160 and its associated components, including random access memory (RAM) 232, read only memory (ROM) 233, input/output device 234, communication interface 239, and memory 235. A data bus may interconnect the processing unit 231, the RAM 232, the ROM 233, the memory 235, the I/O device 234 and the communication interface 239.

Software may be stored within the memory 235 to provide instructions to the processing unit 231 allowing the microprocessor 160 to perform various actions. The memory 235 may store software used by the microprocessor 160 such as an operating system 236, application programs 238, and an associated internal database 237. The various hardware memory units in the memory 235 may include volatile and nonvolatile, removable and non-removable media implemented in any method or technology for storage of information such as computer-readable instructions, data structures, program modules, or other data. The memory 235 may include one or more physical persistent memory devices and/or one or more non-persistent memory devices. The memory 235 may include, but is not limited to, the RAM 232, the ROM 233, an electronically erasable programmable read only memory (EEPROM), flash memory or any other medium that may be used to store the desired information and that may be accessed by the processing unit 231.

Referring to FIG. 1, during operation, the subpack microprocessor 160 generates first and second control signals A, B to induce the first and second subpack contactors 171, 172, respectively to have a closed operational state.

Further, the subpack microprocessor 160 receives a voltage value associated with the first battery cell 131 from the RF receiver 148. The subpack microprocessor 160 determines that the first battery cell 131 has an overvoltage condition when the voltage value is greater than a threshold voltage value. Further, the subpack microprocessor 160 sends an overvoltage message to the master controller 40 via the first and second CAN transceivers 164, 222. As shown, the first and second CAN transceivers 164, 222 operably communicate with one another through the communication bus 80.

Still further, the subpack microprocessor 160 stops generating the first and second control signals to induce the first and second subpack contactors 171, 172, respectively to have an open operational state when the master controller 40 sends an open command to the subpack microprocessor 160 via the first and second CAN transceivers 164, 222 or when no open command is received from the master controller 40 within a predetermined amount of time after sending the overvoltage message.

The first subpack contactor 171 is electrically coupled to the electrical node 201 via the electrical line 191. Further, the first subpack contactor 171 is electrically coupled to the first pack contactor 51 via the electrical line 71.

The second subpack contactor 172 is electrically coupled to the electrical node 203 via the electrical line 195. Further, the second subpack contactor 172 is electrically coupled to the second pack contactor 52 via the electrical line 73.

The second battery subpack 32 is electrically coupled in parallel with the first battery subpack 31. The second battery subpack 32 has an identical circuit as the first battery subpack 31 and includes battery cells, a cell monitoring circuit, an RF transmitter, a subpack microprocessor, and a CAN transceiver. As shown, the second battery subpack 32 is electrically coupled to the electrical lines 71, 73. Alternately, additional battery subpacks are electrically coupled in parallel with the first and second battery subpacks 31, 32 and have identical circuits as the subpacks 31, 32.

The master controller 40 is provided to communicate with the first and second battery subpacks 31, 32 and the vehicle controller 26. Further, the master controller 40 is provided to control an operational state of the first and second pack contactors 51, 52 for controlling whether an operational voltage is applied to the vehicle powertrain 24. The master controller 40 includes a master microprocessor 220, a second CAN transceiver 222, and a communication bus 224. The master microprocessor 220 is operably coupled to the second CAN transceiver 222 utilizing the communication bus 224. The master microprocessor 220 operably communicates with the vehicle controller 26 via the communication bus 81. Further, the master microprocessor 220 is operably coupled to the first and second pack contactors 51, 52. The master microprocessor 220 has an identical internal circuit as the subpack microprocessor 160.

During operation, the master controller 40 generates third and fourth control signals C, D to induce the first and second pack contactors 51, 52, respectively to have a closed operational state.

Further, the master controller 40 receives an overvoltage message from the subpack microprocessor 160 via the first and second CAN transceivers 164, 222. Still further, the master controller 40 sends an open command to the subpack microprocessor 160 to open the first and second subpack contactors 171, 172 when the master controller 40 receives the overvoltage message from the subpack microprocessor 160.

The vehicle powertrain 24 receives an operational voltage from the first battery subpack 31 when the first and second subpack contactors 171, 172 have a closed operational state, and the first and second pack contactors 51, 52 have a closed operational state. The vehicle powertrain 24 utilizes the operational voltage for powering components in the vehicle powertrain 24.

The vehicle controller 26 operably communicates with the master controller 40 and provides instructions to the master controller 40 for obtaining operational information from the first and second battery subpacks 31, 32. The vehicle controller 26 further controls operation of the vehicle powertrain 24.

Referring to FIGS. 1 and 3-5, a flowchart of a method for operating the battery system 22 in the vehicle 20 will now be explained. For purposes of simplicity, only the operation of the first battery subpack 31 will be discussed in the flowchart.

At step 250, the master controller 40 sends a close command to a subpack microprocessor 160 of the first battery subpack 31 to close first and second subpack contactors 171, 172. After step 250 the method advances to step 252.

At step 252, the subpack microprocessor 160 in the first battery subpack 31 generates first and second control signals causing the first and second subpack contactors 171, 172, respectively to close. After step 252, the method advances to step 254.

At step 254, the master controller 40 generates third and fourth control signals causing first and second pack contactors 51, 52, respectively to close. After step 254, the method advances to step 256.

At step 256, the master controller 40 sends a query command to the subpack microprocessor 160 of the first battery subpack 31 to obtain a status of battery cells in the first battery subpack 31. After step 256, the method advances to step 258.

At step 258, the cell monitoring circuit 140 measures a voltage of a first battery cell 131 in the first battery subpack 31. After step 258, the method advances to step 260.

At step 260, the RF transmitter 144 in the first battery subpack 31 sends a voltage value corresponding to the voltage of the first battery cell 131 to an RF receiver 148. After step 260, the method advances to step 262.

At step 262, the subpack microprocessor 160 in the first battery subpack 31 receives the voltage value from the RF receiver 148 and determines the first battery cell 131 has an overvoltage condition when the voltage value is greater than a threshold voltage value. After step 262, the method advances to step 264.

At step 264, the subpack microprocessor 160 in the first battery subpack 31 sends an overvoltage message to the master controller 40 via first and second CAN transceivers 164, 222 in response to the query command. After step 264, the method advances to step 270.

At step 270, the subpack microprocessor 160 makes a determination as to whether the subpack microprocessor 160 received an open command from the master controller 40 via the first and second CAN transceivers 164, 222. If the value of step 270 equals "yes", the method advances to step 272. Otherwise, the method advances to 274.

At step 272, the subpack microprocessor 160 in the first battery subpack 31 stops generating the first and second control signals causing the first and second subpack contactors 171, 172, respectively to open in response to receiving the open command. After step 272, the method advances to step 274.

At step 274, the subpack microprocessor makes a determination as to whether no open command was received by the subpack microprocessor 160 from the master controller 40 within a predetermined amount of time after sending the overvoltage message. If the value of step 274 equals "yes", the method advances to step 276. Otherwise, the method advances to step 278.

At step 276, the subpack microprocessor 160 in the first battery subpack 31 stops generating the first and second control signals causing the first and second subpack contactors 171, 172, respectively to open. After step 276, the method advances to step 278.

At step 278, the master controller 40 sends a reduced performance message to a vehicle controller 26 when the first and second subpack contactors 171, 172 each have the open operational state. The reduced performance message indicates that the battery system 22 can only provide a reduced amount of electrical power since the first battery subpack 31 is de-coupled from the other battery packs.

At step 280, the vehicle controller 26 communicates with vehicle subsystem controllers 27 to instruct the vehicle subsystem controllers 27 to reduce an amount of electrical power required by vehicle subsystems 28 from the battery system 22 in response to the reduced performance message. The vehicle subsystems 28 are controlled by the vehicle subsystem controllers 27.

Figures 5, 6:
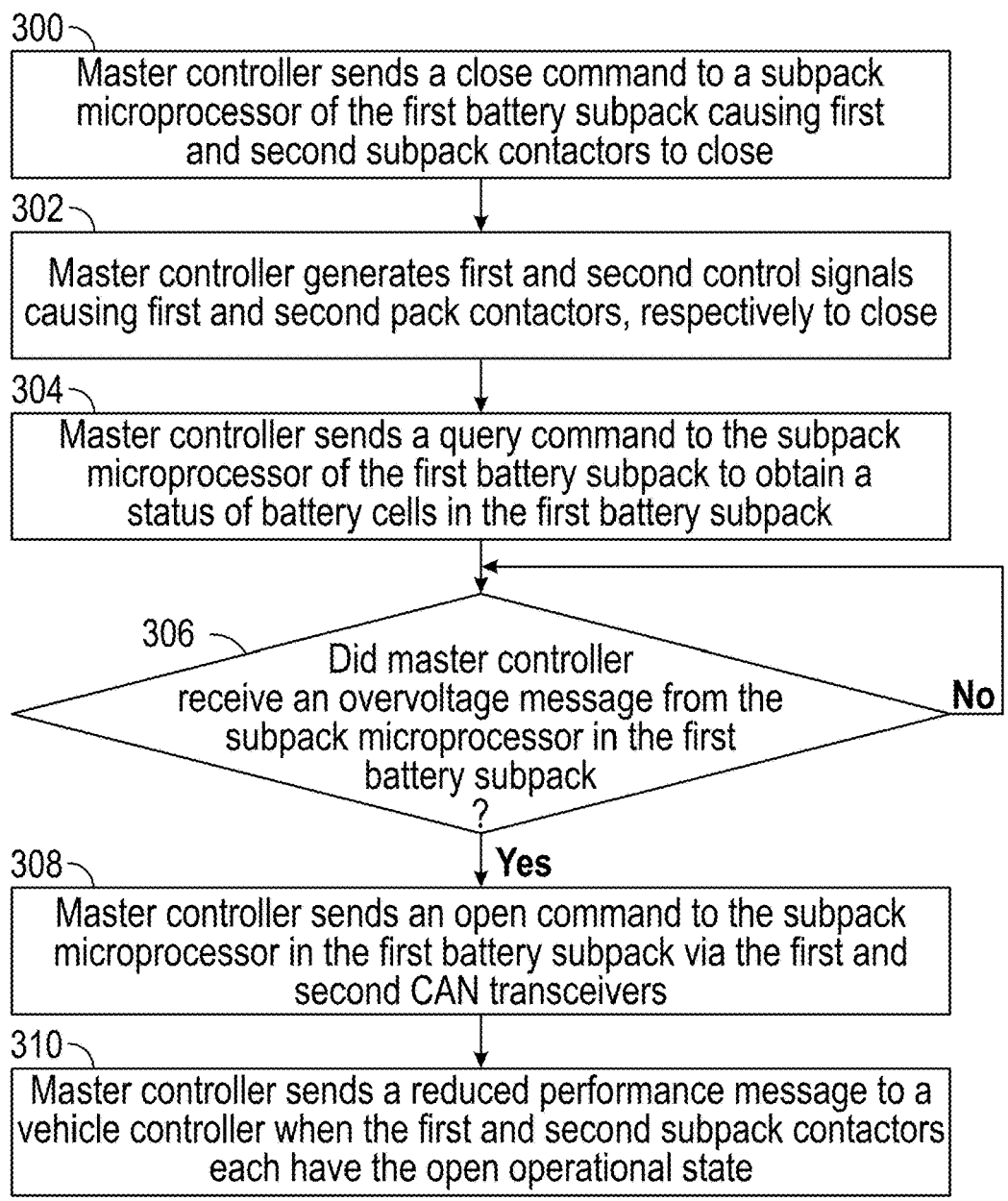
FIG. 6 is a flowchart implemented by a master controller in the vehicle of FIG. 1.

Referring to FIG. 6, a flowchart of a method implemented by the master controller 40 will now be explained.

At step 300, the master controller 40 sends a close command to a subpack microprocessor 160 of the first battery subpack 31 causing first and second subpack contactors 171, 172 to close. After step 300, the method advances to step 302.

At step 302, the master controller 40 generates first and second control signals C, D, causing first and second pack contactors 51, 52, respectively, to close. After step 302, the method advances to step 304.

At step 304, the master controller 40 sends a query command to the subpack microprocessor 160 of the first battery subpack 31 to obtain a status of battery cells in the first battery subpack 31. After step 304, the method advances to step 306.

At step 306, the master controller 40 makes a determination as to whether the master controller 40 received an overvoltage message from the subpack microprocessor 160 in the first battery subpack 31. If the value of step 306 equals "yes", the method advances to step 308. Otherwise, the method returns to step 306.

At step 308, the master controller 40 sends an open command to the subpack microprocessor 160 in the first battery subpack 31 via the first and second CAN transceivers 164, 222. After step 308, the method advances to step 310.

At step 310, the master controller 40 sends a reduced performance message to a vehicle controller 26 when the first and second subpack contactors 171, 172 each have the open operational state.

Figure 7:
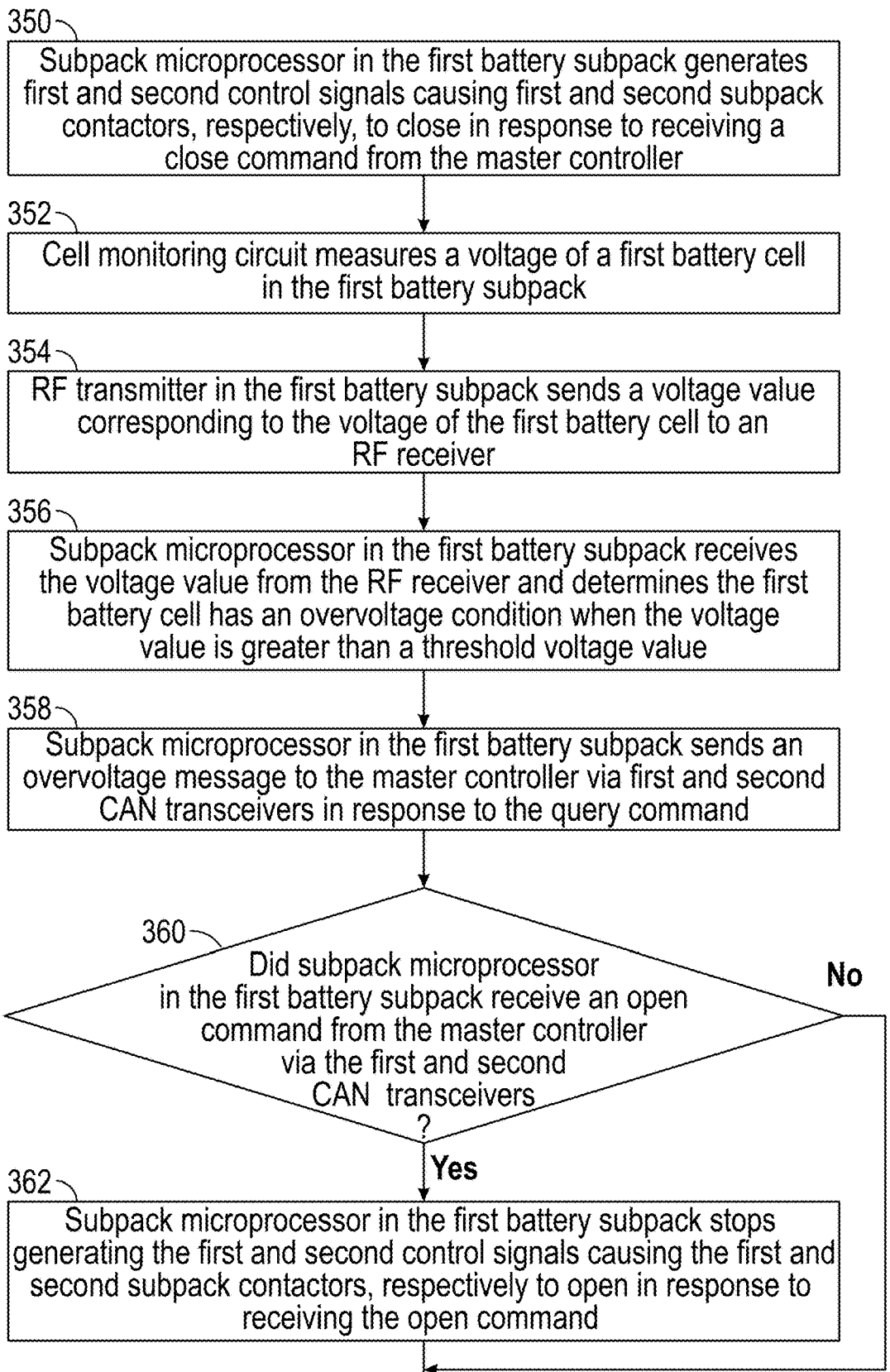
FIGS. 7 and 8 are flowcharts implemented by a first battery subpack in the vehicle of FIG. 1.
Figure 8:
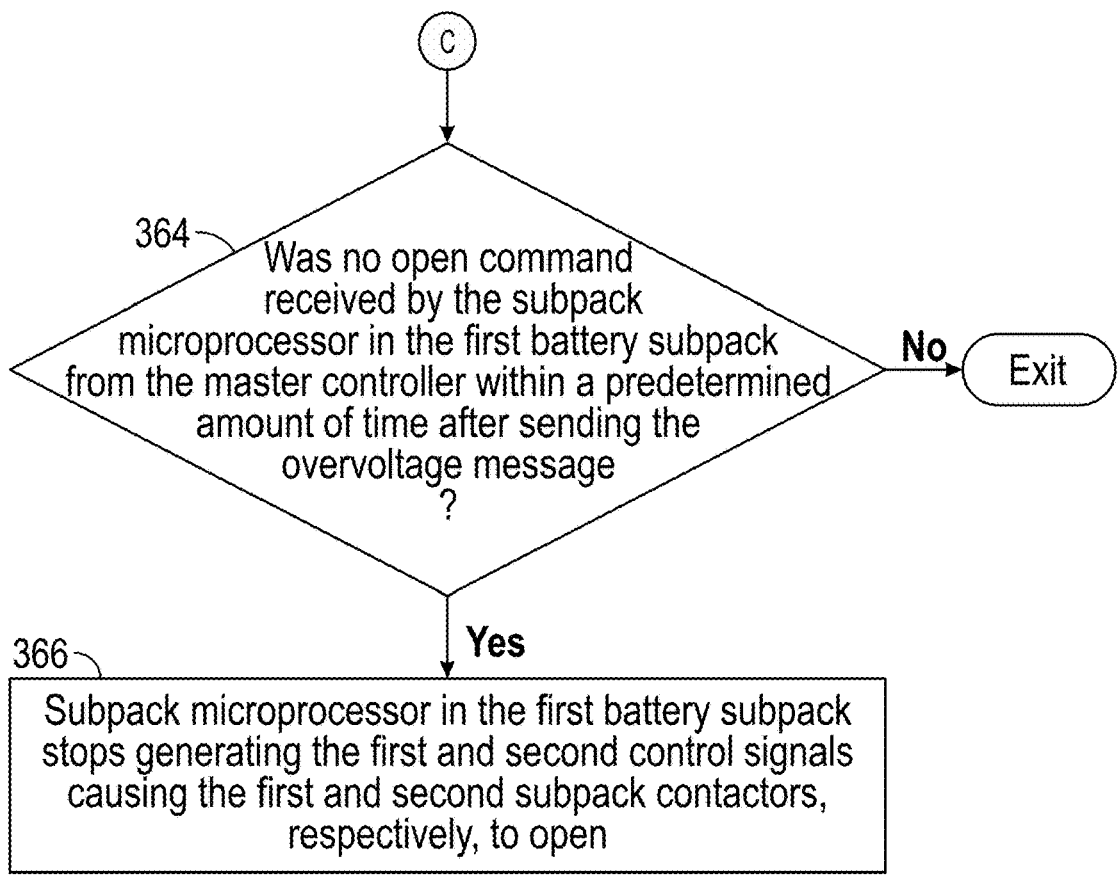

Referring to FIGS. 7 and 8, a flowchart of a method implemented by the first battery subpack 31 will now be explained.

At step 350, the subpack microprocessor 160 in the first battery subpack 31 generates first and second control signals A, B, causing first and second subpack contactors 171, 172, respectively, to close in response to receiving a close command from the master controller 40. After step 350, the method advances to step 352.

At step 352, the cell monitoring circuit 140 measures a voltage of a first battery cell 131 in the first battery subpack 31. After step 352, the method advances to step 354.

At step 354, the RF transmitter 144 in the first battery subpack 31 sends a voltage value corresponding to the voltage of the first battery cell 131 to an RF receiver 148. After step 354, the method advances to step 356.

At step 356, the subpack microprocessor 160 in the first battery subpack 31 receives the voltage value from the RF receiver 148 and determines the first battery cell 131 has an overvoltage condition when the voltage value is greater than a threshold voltage value. After step 356, the method advances to step 358.

At step 358, the subpack microprocessor 160 in the first battery subpack 31 sends an overvoltage message to the master controller 40 via first and second CAN transceivers 164, 222 in response to the query command. After step 358, the method advances to step 360.

At step 360, the subpack microprocessor 160 in the first battery subpack 31 makes a determination as to whether the subpack microprocessor 160 received an open command from the master controller 40 via the first and second CAN transceivers 164, 222. If the value of step 360 equals "yes", the method advances to step 362. Otherwise, the method advances to step 364.

At step 362, the subpack microprocessor 160 in the first battery subpack 31 stops generating the first and second control signals A, B, causing the first and second subpack contactors 171, 172, respectively to open in response to receiving the open command. After step 362, the method advances to step 364.

At step 364, the subpack microprocessor 160 in the first battery subpack 31 makes a determination as to whether the subpack microprocessor 160 did not receive an open command from the master controller 40 within a predetermined amount of time after sending the overvoltage message. If the value of step 364 equals "yes", the method advances to step 366. Otherwise, the method is exited.

At step 366, the subpack microprocessor 160 in the first battery subpack 31 stops generating the first and second control signals A, B, causing the first and second subpack contactors 171, 172, respectively, to open.

Figure 9:
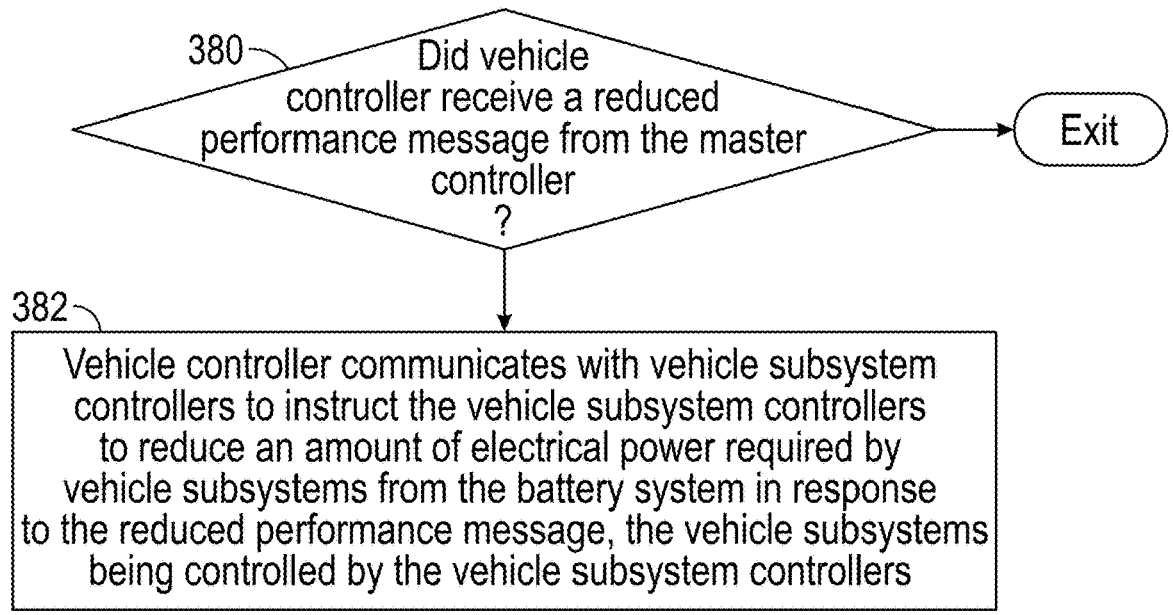
FIG. 9 is a flowchart implemented by a vehicle controller in the vehicle of FIG. 1.

Referring to FIG. 9, a flowchart of a method implemented by the vehicle controller 26 will now be explained.

At step 380, the vehicle controller 26 makes a determination as to whether the vehicle controller 26 received a reduced performance message from the master controller 40. If the value of step 380 equals "yes", the method advances to step 382. Otherwise, the method is exited.

At step 382, the vehicle controller 26 communicates with vehicle subsystem controllers 27 to instruct the vehicle subsystem controllers 27 to reduce an amount of electrical power required by vehicle subsystems 28 from the battery system 22 in response to the reduced performance message. The vehicle subsystems 28 are controlled by the vehicle subsystem controllers 27.

It is noted that although the battery system 22 has been utilized in a vehicle herein, in an alternate design the battery system 22 could be utilized in a stationary energy storage system (ESS) that supplies electrical power to any desired electrical load (other than a vehicle powertrain).

While the claimed system has been described in detail in connection with only a limited number of systems, it should be readily understood that the system is not limited to such disclosed system. Rather, the claimed system can be modified to incorporate any number of variations, alterations, substitutions or equivalent arrangements not heretofore described, but which are commensurate with the spirit and scope of the disclosure. Additionally, while various aspects of the claimed system have been described, it is to be understood that aspects of the system may include only some of the described aspects. Accordingly, the claimed system is not to be seen as limited by the foregoing description.

What is claimed is:

1. A battery system, comprising:

a battery subpack having first and second battery cells electrically coupled in series to one another, a cell monitoring circuit, a RF transmitter, an RF receiver, a subpack microprocessor, and a first transceiver; the cell monitoring circuit being operably coupled to the first and second battery cells and the RF transmitter, the subpack microprocessor being operably coupled to the RF receiver and the first transceiver, the cell monitoring circuit measuring a voltage of the first battery cell;

a master controller having a second transceiver that communicates with the first transceiver;

the RF transmitter of the battery subpack sending a voltage value corresponding to the voltage of the first battery cell to the RF receiver;

the subpack microprocessor receiving the voltage value from the RF receiver and determining the first battery cell has an overvoltage condition based on the voltage value;

the subpack microprocessor sending an overvoltage message to the master controller via the first and second transceivers; and the subpack microprocessor inducing first and second subpack contactors to each have an open operational state when the master controller sends an open command to the subpack microprocessor via the first and second transceivers.

2. The battery system of claim 1, wherein:

the first subpack contactor being coupled to a positive terminal of the first battery cell; and the second subpack contactor being coupled to a negative terminal of the second battery cell.

3. The battery system of claim 1, wherein:

the subpack microprocessor inducing the first and second subpack contactors to each have the open operational state when no open command is received from the master controller within a predetermined amount of time after sending the overvoltage message.

4. The battery system of claim 1, wherein:

the subpack microprocessor determining the first battery cell has the overvoltage condition when the voltage value is greater than a threshold voltage value.

5. The battery system of claim 1, wherein:

the master controller sending the open command to the subpack microprocessor via the first and second transceivers when the master controller receives the overvoltage message.

6. The battery system of claim 1, further comprising:

a first pack contactor electrically coupled to the first subpack contactor; and a second pack contactor electrically coupled to the second subpack contactor.

7. The battery system of claim 1, wherein:

the master controller having a master microprocessor operably coupled to the second transceiver, the second transceiver operably communicating with the first transceiver, the first transceiver being a first CAN transceiver, and the second transceiver being a second CAN transceiver.

8. The battery system of claim 1, wherein:

the master controller sending a reduced performance message to a vehicle controller when the first and second subpack contactors each have the open operational state.

9. A battery system, comprising:

a battery subpack having first and second battery cells electrically coupled in series to one another, a cell monitoring circuit, a RF transmitter, an RF receiver, a subpack microprocessor, and a first transceiver; the cell monitoring circuit being operably coupled to the first and second battery cells and the RF transmitter, the subpack microprocessor being operably coupled to the RF receiver and the first Transceiver, the cell monitoring circuit measuring a voltage of the first battery cell;

a master controller having a second transceiver that communicates with the first transceiver;

the RF transmitter of the battery subpack sending a voltage value corresponding to the voltage of the first battery cell to the RF receiver;

the subpack microprocessor receiving the voltage value from the RF receiver and determining the first battery cell has an overvoltage condition based on the voltage value;

the subpack microprocessor sending an overvoltage message to the master controller via the first and second transceivers; and the subpack microprocessor inducing first and second subpack contactors to each have an open operational state when no open command is received from the master controller within a predetermined amount of time after sending the overvoltage message.

10. The battery system of claim 9, further comprising:

the first subpack contactor being coupled to a positive terminal of the first battery cell; and the second subpack contactor being coupled to a negative terminal of the second battery cell.

11. The battery system of claim 9, wherein:

the subpack microprocessor determining the first battery cell has the overvoltage condition when the voltage value is greater than a threshold voltage value.

12. The battery system of claim 9, wherein:

the master controller sending the open command to the subpack microprocessor via the first and second transceivers when the master controller receives the overvoltage message.

13. The battery system of claim 9, further comprising:

a first pack contactor electrically coupled to the first subpack contactor; and a second pack contactor electrically coupled to the second subpack contactor.

14. The battery system of claim 9, wherein:

the master controller having a master microprocessor operably coupled to the second transceiver, the second transceiver operably communicating with the first transceiver, the first transceiver being a first CAN transceiver, and the second transceiver being a second CAN transceiver.

15. The battery system of claim 9, wherein:

the master controller sending a reduced performance message to a vehicle controller when the first and second subpack contactors each have the open operational state.

16. A battery system, comprising:

a battery subpack having first and second battery cells electrically coupled in series to one another, a cell monitoring circuit, a RF transmitter, an RF receiver, a subpack microprocessor, and a first transceiver; the cell monitoring circuit being operably coupled to the first and second battery cells and the RF transmitter, the subpack microprocessor being operably coupled to the RF receiver and the first transceiver, the cell monitoring circuit measuring a voltage of the first battery cell;

a master controller having a second transceiver that communicates with the first transceiver;

the RF transmitter of the battery subpack sending a voltage value corresponding to the voltage of the first battery cell to the RF receiver;

the subpack microprocessor receiving the voltage value from the RF receiver and determining the first battery cell has an overvoltage condition based on the voltage value;

the subpack microprocessor sending an overvoltage message to the master controller via the first and second transceivers; and the subpack microprocessor inducting first and second subpack contactors to each have an open operational state when the master controller sends an open command to the subpack microprocessor via the first and second transceivers or when no open command is received from the master controller within a predetermined amount of time after sending the overvoltage message.

17. The battery system of claim 16, wherein:
the subpack microprocessor determining the first battery cell has the overvoltage condition when the voltage value is greater than a threshold voltage value.

18. The battery system of claim 16, wherein:
the master controller sending the open command to the subpack microprocessor via the first and second transceivers when the master controller receives the overvoltage message, the first transceiver being a first CAN transceiver, and the second transceiver being a second CAN transceiver.

19. The battery system of claim 16, further comprising:
a first pack contactor electrically coupled to the first subpack contactor; and
a second pack contactor electrically coupled to the second subpack contactor.

20. The battery system of claim 16, wherein:
the master controller sending a reduced performance message to a vehicle controller when the first and second subpack contactors each have the open operational state.

* * * * *